(12) United States Patent
Matsuoka

(10) Patent No.: US 7,333,319 B2
(45) Date of Patent: Feb. 19, 2008

(54) SOLID ELECTROLYTIC DEVICE

(75) Inventor: Keiko Matsuoka, Izumisano (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 11/471,547

(22) Filed: Jun. 21, 2006

(65) Prior Publication Data

US 2006/0291143 A1 Dec. 28, 2006

(30) Foreign Application Priority Data

Jun. 23, 2005 (JP) .............................. 2005-182860

(51) Int. Cl.
*H01G 9/00* (2006.01)
(52) U.S. Cl. ...................... 361/523; 361/525; 361/528; 361/529; 361/534; 361/516; 29/25.01; 29/25.03
(58) Field of Classification Search ................ 361/523, 361/524, 525–528, 529–534, 516–519; 29/25.01, 29/25.03
See application file for complete search history.

(56) References Cited

U.S. PATENT DOCUMENTS

| | | | | |
|---|---|---|---|---|
| 5,583,740 A | * | 12/1996 | Fujino | 361/534 |
| 6,188,566 B1 | * | 2/2001 | Aoyama | 361/534 |
| 6,421,227 B2 | * | 7/2002 | Nitoh et al. | 361/523 |
| 6,751,086 B2 | * | 6/2004 | Matsumoto | 361/523 |
| 6,813,141 B2 | * | 11/2004 | Kuroyanagi | 361/533 |
| 6,975,503 B2 | * | 12/2005 | Abe et al. | 361/533 |
| 7,116,548 B2 | * | 10/2006 | Satterfield et al. | 361/528 |

* cited by examiner

*Primary Examiner*—Nguyen T. Ha
(74) *Attorney, Agent, or Firm*—Westerman, Hattori, Daniels & Adrian, LLP.

(57) ABSTRACT

To provide a solid electrolytic capacitor capable of being miniaturized with larger capacitance. A solid electrolytic capacitor comprises a capacitor element, an anode lead frame, a cathode lead frame, an adhesive layer and an exterior resin. The anode lead frame is connected to an anode of the capacitor element. The cathode lead frame includes a first and a second cathode leads and a boundary part. The first cathode lead is connected to a cathode of the capacitor element by the adhesive layer. The boundary part is disposed between the first cathode lead and the second cathode lead so as to provide a level difference at the capacitor element side. The exterior resin covers the capacitor element, a part of the anode lead frame, a part of the cathode lead frame and the adhesive layer.

13 Claims, 15 Drawing Sheets

SOLID ELECTROLYTIC DEVICE

The priority application Number JP2005-182860 upon which this patent application is based is hereby incorporated by reference.

BACKGROUND OF THE INVENTION

1. Field of the Invention

The present invention relates to a solid electrolytic capacitor, and more particularly to a structure of a cathode lead frame.

2. Description of the Related Art

With digitization of an electronic device, a solid electrolytic capacitor for use is required to be smaller in size and larger in capacitance, and a solid electrolytic capacitor disclosed in Japanese Unexamined Patent Publication No. 10-64761 is conventionally known.

FIG. 24 is a schematic cross-sectional view showing a structure of a conventional solid electrolytic capacitor. Referring to FIG. 24, a conventional solid electrolytic capacitor 200 comprises a capacitor element 210, an anode lead frame 220, a cathode lead frame 230, an adhesive 240 and an exterior resin 250.

The capacitor element 210 has a structure that a dielectric coating film, a solid electrolyte layer and a cathode extraction layer are sequentially formed on a surface of an anode body made of a sintered body of a valve action metal such as tantalum, niobium, titanium, aluminum and the like. The capacitor element 210 has an anode lead pin 211 integrally formed with the anode body.

The anode lead frame 220 comprises a first part 220A and a second part 220B. And the first part 220A is disposed inside the exterior resin 250 to be connected to the anode lead pin 211. The second part 220B is disposed along the exterior resin 250 at the outside of the exterior resin 250.

The cathode lead frame 230 comprises a first part 230A and a second part 230B. The first part 230A is disposed inside the exterior resin 250 to be connected to the cathode extraction layer of the capacitor element 210 by the adhesive 240. The second part 230B is disposed along the exterior resin 250 at the outside of the exterior resin 250.

The adhesive 240 is disposed between the capacitor element 210 and the first part 230A of the cathode lead frame 230. The exterior resin 250 covers the capacitor element 210, the first part 220A of the anode lead frame 220, the first part 230A of the cathode lead frame 230 and the adhesive 240.

When the capacitor element 210 is covered and sealed with the exterior resin 250, the thickness of the exterior resin 250 is set so that the first part 230A of the cathode lead frame 230 will not protrude from the exterior resin 250 due to a dimensional error and the like.

Moreover, the thicknesses of the anode lead frame 220 and the cathode lead frame 230 are set so that a problem such as deformation will not occur during delivery in a manufacturing process of the solid electrolytic capacitor 200, thereby ensuring the strength of the anode lead frame 220 and the cathode lead frame 230.

SUMMARY OF THE INVENTION

When reducing the thickness of the solid electrolytic capacitor 200, however, the proportion of the thickness of the cathode lead frame 230 to the thickness of the capacitor element 210 is increased. Since the cathode lead frame 230 does not contribute to the capacitance of the capacitor, there arises the problem that the volumetric capacitance efficiency, which is the capacitance per unit volume, of the solid electrolytic capacitor 200 is decreased.

In addition, when reducing the thickness of the cathode lead frame 230 so as to increase the volumetric capacitance efficiency of the solid electrolytic capacitor 200, the anode lead frame 220 as well as the cathode lead frame 230 is reduced in thickness, because the anode lead frame 220 generally has the same thickness as the cathode lead frame 230. Then, the whole strength of the lead frame, which is a base of the anode lead frame 220 and the cathode lead frame 230, is reduced. As a result, the lead frame is deformed during the manufacturing process of the solid electrolytic capacitor 200, leading to the problem that the lead frame having the capacitor element 210 disposed thereupon cannot be stored in a magazine rack used for delivery.

The present invention is made to solve above-described problems and has an objective to provide a solid electrolytic capacitor capable of being miniaturized with larger capacitance.

Furthermore, the present invention has another objective to provide a solid electrolytic capacitor ensuring the strength of a lead frame as well as capable of being miniaturized with larger capacitance.

According to the present invention, a solid electrolytic capacitor comprises a capacitor element, an anode lead frame, a cathode lead frame and an exterior resin. The anode lead frame is connected to an anode of the capacitor element. The cathode lead frame is connected to a cathode of the capacitor element. The exterior resin covers the capacitor element, a part of the anode lead frame and a part of the cathode lead frame. The cathode lead frame includes a first and a second cathode lead frames and a boundary part. The first cathode lead frame is connected to the cathode of the capacitor element. The boundary part is disposed between the first cathode lead frame and the second cathode lead frame so as to provide a level difference at the capacitor element side. The part of the first cathode lead frame connected to the cathode is disposed inside the exterior resin. The first cathode lead frame is thinner in thickness than the second cathode lead frame.

Preferably, a solid electrolytic capacitor further comprises an adhesive layer. The adhesive layer bonds the first cathode lead frame to the cathode. The adhesive layer is thinner in thickness than the second cathode lead frame.

Moreover, according to the present invention, a solid electrolytic capacitor comprises a capacitor element, an anode lead frame, a cathode lead frame, an adhesive layer and an exterior resin. The anode lead frame is connected to an anode of the capacitor element. The cathode lead frame is connected to a cathode of the capacitor element. The adhesive layer bonds the cathode lead frame to the cathode. The exterior resin covers the capacitor element, a part of the anode lead frame, a part of the cathode lead frame and the adhesive layer. The adhesive layer is thinner in thickness than the cathode lead frame.

Preferably, the cathode lead frame includes a first and a second cathode lead frames and a boundary part. The first cathode lead frame is connected to a cathode of the capacitor element. The boundary part is disposed between the first cathode lead frame and the second cathode lead frame so as to provide a level difference at the capacitor element side. The first cathode lead frame is thinner in thickness than the second cathode lead frame.

Preferably, the first cathode lead frame is disposed inside the exterior resin, and at least a part of the second cathode lead frame is disposed along the exterior resin.

Preferably, the boundary part between the first cathode lead frame and the second cathode lead frame is disposed inside the exterior resin.

Preferably, the capacitor element comprises a cube or a rectangular parallelepiped whose cross-sectional shape is quadrangular. The boundary part is disposed on an end of either a first plane or a second plane disposed in the thickness direction of the capacitor element.

Preferably, the exterior resin comprises a cube or a rectangular parallelepiped whose cross-sectional shape is quadrangular. The boundary part is disposed close to either a first plane or a second plane disposed generally perpendicular to two planes disposed in the thickness direction of the exterior resin.

Preferably, the capacitor element comprises a cube or a rectangular parallelepiped whose cross-sectional shape is quadrangular. The first cathode lead frame is disposed inside the exterior resin and generally parallel to the capacitor element.

Preferably, the boundary part between the first cathode lead frame and the second cathode lead frame is disposed outside the exterior resin.

Preferably, the capacitor element comprises a cube or a rectangular parallelepiped whose cross-sectional shape is quadrangular. The first cathode lead frame is disposed inside the exterior resin and generally parallel to the capacitor element.

Preferably, the boundary part has a rectangular cross-sectional shape.

Preferably, the boundary part has a level difference composed of a slope formed in the direction from the second cathode lead frame toward the first cathode lead frame.

In the solid electrolytic capacitor according to the present invention, the first cathode lead frame of the cathode lead frames, which is connected to a cathode of the capacitor element, is thinner in thickness than the second cathode lead frame, and the level difference provided between the first cathode lead frame and the second cathode lead frame is disposed at the capacitor element side. Accordingly, the volume of the capacitor element can be increased.

Thus, according to the present invention, the volumetric capacitance efficiency can be enhanced.

Also, in the solid electrolytic capacitor according to the present invention, the adhesive layer is thinner in thickness than the cathode lead frame, thereby increasing the volume of the capacitor element.

Thus, the volumetric capacitance efficiency can be enhanced according to the present invention.

Figure 1:
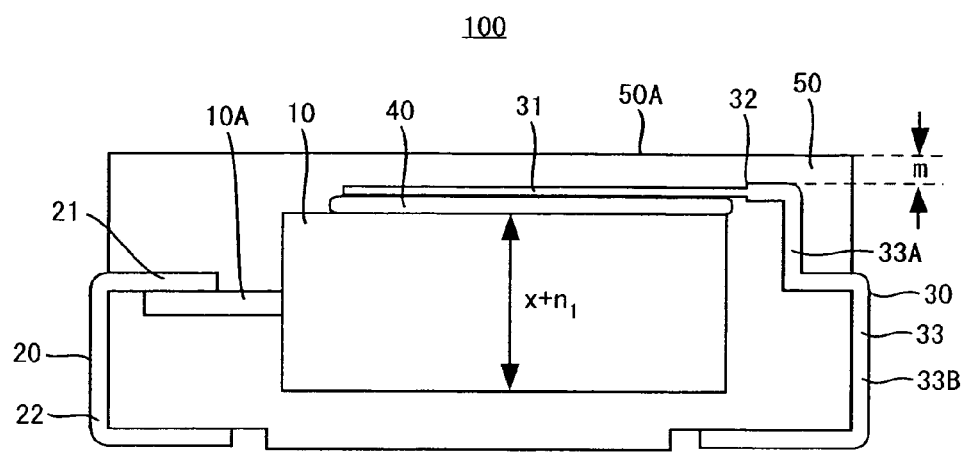
FIG. 1 is a schematic cross-sectional view of a structure of a solid electrolytic capacitor according to the first embodiment of the present invention.

The foregoing and other objects, features, aspects and advantages of the present invention will become more apparent from the following detailed description of the present invention when reviewed in conjunction with the accompanying drawings.

DETAILED DESCRIPTION OF THE PREFERRED EMBODIMENTS

Descriptions now will be made on embodiments of the present invention with reference to the drawings. The same or equivalent elements in the drawings are denoted with the same reference numbers, and the description is not repeated.

The First Embodiment

FIG. 1 is a schematic cross-sectional view illustrating a structure of a solid electrolytic capacitor according to the first embodiment of the present invention. With reference to FIG. 1, a solid electrolytic capacitor 100 according to the first embodiment comprises a capacitor element 10, an anode lead frame 20, a cathode lead frame 30, an adhesive layer 40 and an exterior resin 50.

The capacitor element 10 comprises a cube or a rectangular parallelepiped whose cross-sectional shape is quadrangular, having an anode lead pin 10A. The anode lead frame 20 and the cathode lead frame 30 are made of Alloy 42 respectively. The anode lead frame 20 is composed of the anode leads 21 and 22. The anode lead 21 is disposed inside the exterior resin 50 to be connected to the anode lead pin 10A. The anode lead 22 is disposed along the exterior resin 50 at the outside of the exterior resin 50.

The cathode lead frame 30 includes a cathode lead 31, a cathode lead 33 and a boundary part 32. The cathode lead 33 comprises a first part 33A and a second part 33B. The cathode lead 31, the boundary part 32 and the first part 33A of the cathode lead 33 are disposed inside the exterior resin 50. The second part 33B of the cathode lead 33 is disposed along the exterior resin 50 at the outside of the exterior resin 50. And the cathode lead 31 is connected to the capacitor element 10 by the adhesive layer 40. The boundary part 32 is disposed between the cathode lead 31 and the cathode lead 33.

The adhesive layer 40 is made of a conductive adhesive, having a thickness of 0.1 mm. And the adhesive layer 40 is disposed between the capacitor element 10 and the cathode lead 31. The exterior resin 50 comprises a cube or a rectangular parallelepiped whose cross-sectional shape is quadrangular. The exterior resin 50 is made of an epoxy resin, covering the capacitor element 10, the anode lead 21, the cathode lead 31, the boundary part 32, the first part 33A of the cathode lead 33 and the adhesive layer 40. Here, a distance between a surface 50A of the exterior resin 50 and the cathode lead frame 30 is set to a minimum distance m so that the cathode lead frame 30 will not protrude from the exterior resin 50 due to a dimensional error, a positioning error or the like of the cathode lead frame 30. This minimum distance m is set to the same distance as the minimum distance of the conventional solid electrolytic capacitor 200 (see FIG. 24).

Figure 2:
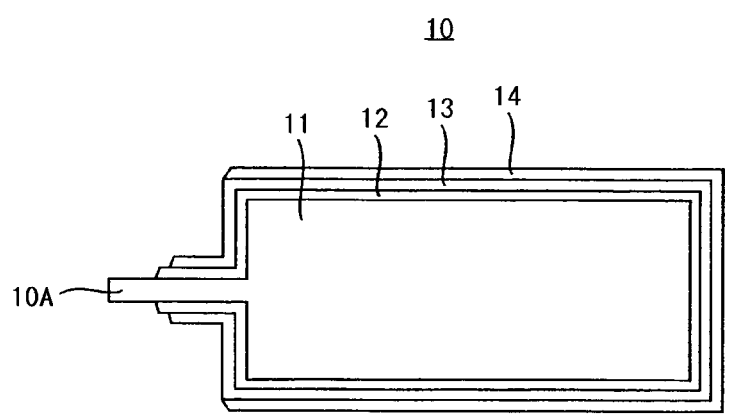
FIG. 2 is a schematic cross-sectional view illustrating a structure of a capacitor element illustrated in FIG. 1.

FIG. 2 is a schematic cross-sectional view illustrating the structure of the capacitor element 10 shown in FIG. 1. Referring to FIG. 2, the capacitor element 10 includes an anode body 11, a dielectric coating film 12, a solid electrolyte layer 13 and a cathode extraction layer 14. The anode lead pin 10A is integrally formed with the anode body 11.

The anode body 11 is made of a tantalum sintered body. The dielectric coating film 12 is made of a tantalum oxide layer ($Ta_2O_5$) to be formed on the surface of the anode body 11. The solid electrolyte layer 13 is made of polypyrrole, which is a conductive polymer, to be formed to cover the dielectric coating film 12. The cathode extraction layer 14 is made of either carbon (C) or silver (Ag) to be formed to cover the solid electrolyte layer 13. The cathode lead 31 shown in FIG. 1 is connected to the cathode extraction layer 14 through the adhesive layer 40.

Figure 3:
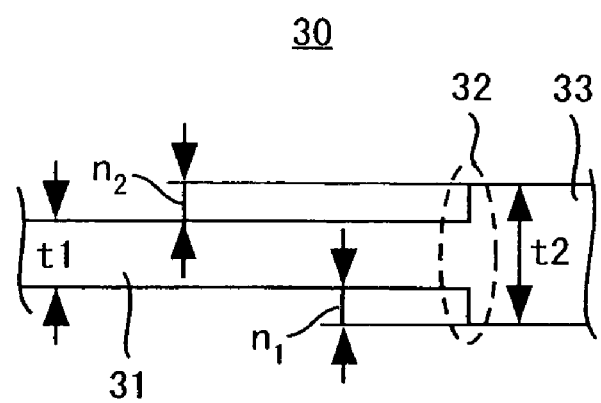
FIG. 3 is an enlarged view of around a boundary part of a cathode lead frame illustrated in FIG. 1.
Figure 4:
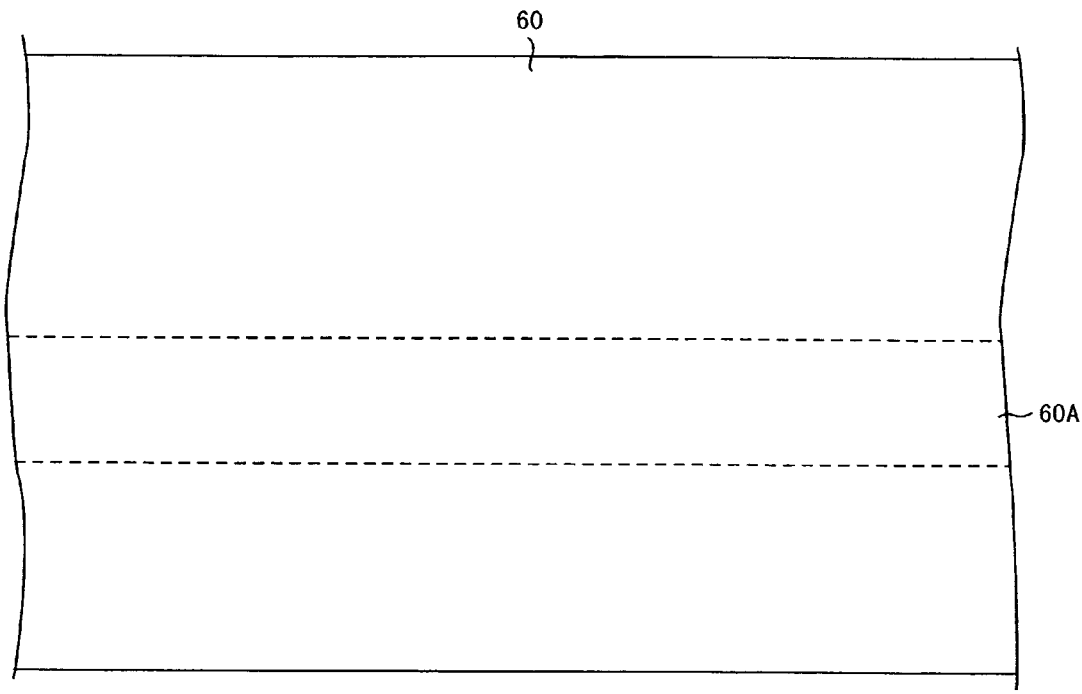
FIG. 4 is a first process drawing for explaining a manufacturing method of the solid electrolytic capacitor illustrated in FIG. 1.
Figure 5:
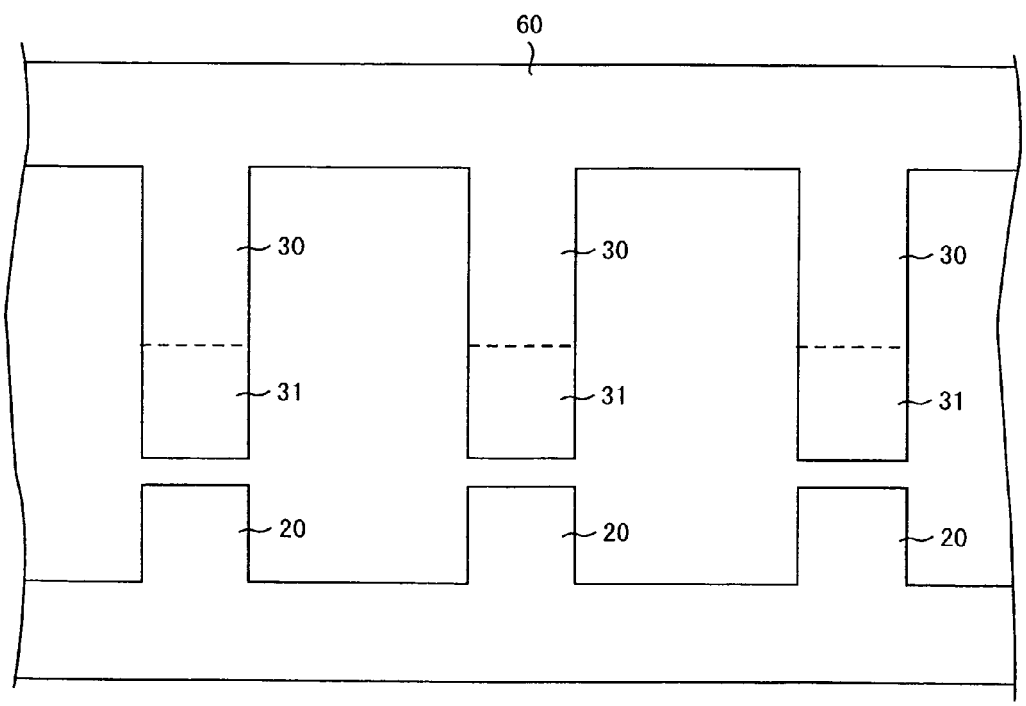
FIG. 5 is a second process drawing for explaining the manufacturing method of the solid electrolytic capacitor illustrated in FIG. 1.

FIG. 3 is an enlarged view of around the boundary part 32 of the cathode lead frame 30 illustrated in FIG. 1. Referring to FIG. 3, the cathode lead 31 has a thickness t1 of 0.05 mm, and the cathode lead 33 has a thickness t2 of 0.1 mm.

The boundary part 32 has a rectangular cross-sectional shape, having level differences $n_1$ and $n_2$. The level difference $n_1$ is provided at the side of the capacitor element 10, whereas the level difference $n_2$ is provided at the opposite side of the capacitor element 10. The level differences $n_1$ and $n_2$ are 0.025 mm respectively. Accordingly, the boundary part 32 is disposed between the cathode lead 31 and the cathode lead 33 so that the level differences $n_1$ and $n_2$ are respectively provided at the side of the capacitor element 10 and at the opposite side of the capacitor element 10.

The cathode lead frame 30 has a structure that a part of a cathode lead frame having a thickness of 0.1 mm is reduced in thickness from both sides. The cathode lead frame 30 is manufactured by pressing a corresponding part of the cathode lead 31 in the cathode lead frame having the thickness of 0.1 mm into the thickness of 0.05 mm.

Thus, in the present invention, the cathode lead frame 30 has a structure that the connected part to the capacitor element 10 (the cathode lead 31) is thinner than the other part (the cathode lead 33).

Figure 24:
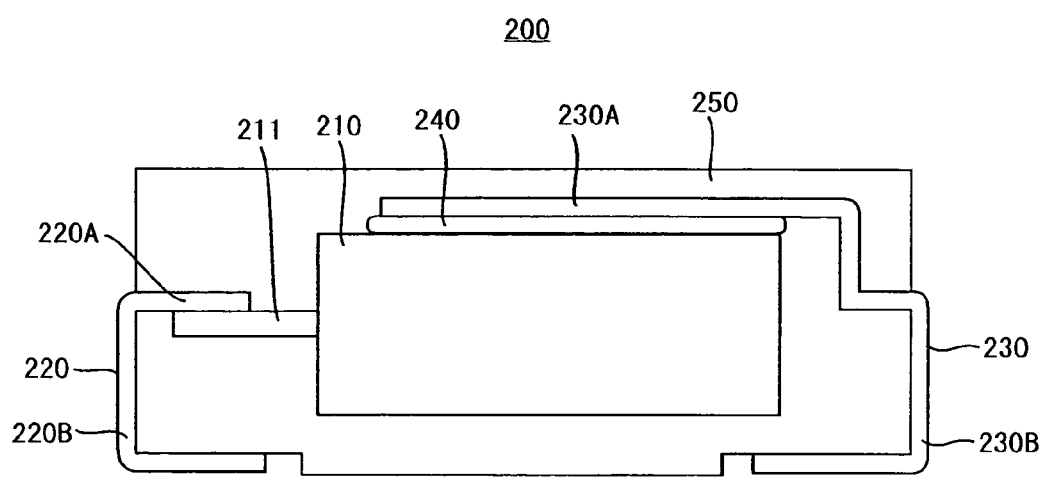
FIG. 24 is a schematic cross-sectional view illustrating a structure of a conventional solid electrolytic capacitor.

The conventional solid electrolytic capacitor 200, as illustrated in FIG. 24, has the cathode lead frame 230 which has a uniform thickness. All over the cathode lead frame 230 has the thickness of 0.1 mm. When the thickness of the capacitor element 210 of the conventional solid electrolytic capacitor 200 is set to x, the thickness of the capacitor element 10 is set to x+$n_1$ (see FIG. 1). Accordingly, by using the cathode lead frame 30 manufactured so as to provide the level difference $n_1$ at the side of the capacitor element 10, the thickness of the capacitor element 10 can be made thicker just by $n_1$ than the thickness x of the capacitor element 210 used for the conventional solid electrolytic capacitor 200, while keeping the uniform thickness of the exterior resin 50.

Although the thickness increase $n_1$ of the capacitor element 10 is as small as 0.05 mm, the capacitance of the capacitor element 10 is significantly increased by the increased volume of the capacitor element 10, because the increased volume of the capacitor element 10 is determined by multiplying the thickness increase $n_1$ by dimensions of the part of the cathode lead frame 30 connected to the capacitor element 10.

In addition, in the solid electrolytic capacitor 100, the cathode lead frame 30 has the level difference $n_2$ at the opposite side of the capacitor element 10, and therefore the thickness of the exterior resin 50 disposed on the cathode lead frame 30 can be made thicker just by $n_2$. In general, the moisture resistance can be improved by thickening the exterior resin 50, and accordingly, in the solid electrolytic capacitor 100, the moisture resistance can also be improved by using the cathode lead frame 30.

Furthermore, in the cathode lead frame 30, the cathode lead 33 has the thickness of 0.1 mm, thereby ensuring the strength of the cathode lead frame 30.

FIG. 4 to FIG. 10 are respectively the first to the seventh process drawings for explaining a manufacturing method of the solid electrolytic capacitor 100 shown in FIG. 1. When manufacturing of the solid electrolytic capacitor 100 is started, a part 60A of a lead frame 60 having 0.1 mm in thickness is pressed into a thickness of 0.05 mm (see FIG. 4). After that, the part 60A of the lead frame 60 is punched out to form a plurality of anode lead frames 20 and a plurality of cathode lead frames 30 (see FIG. 5).

Figure 6:
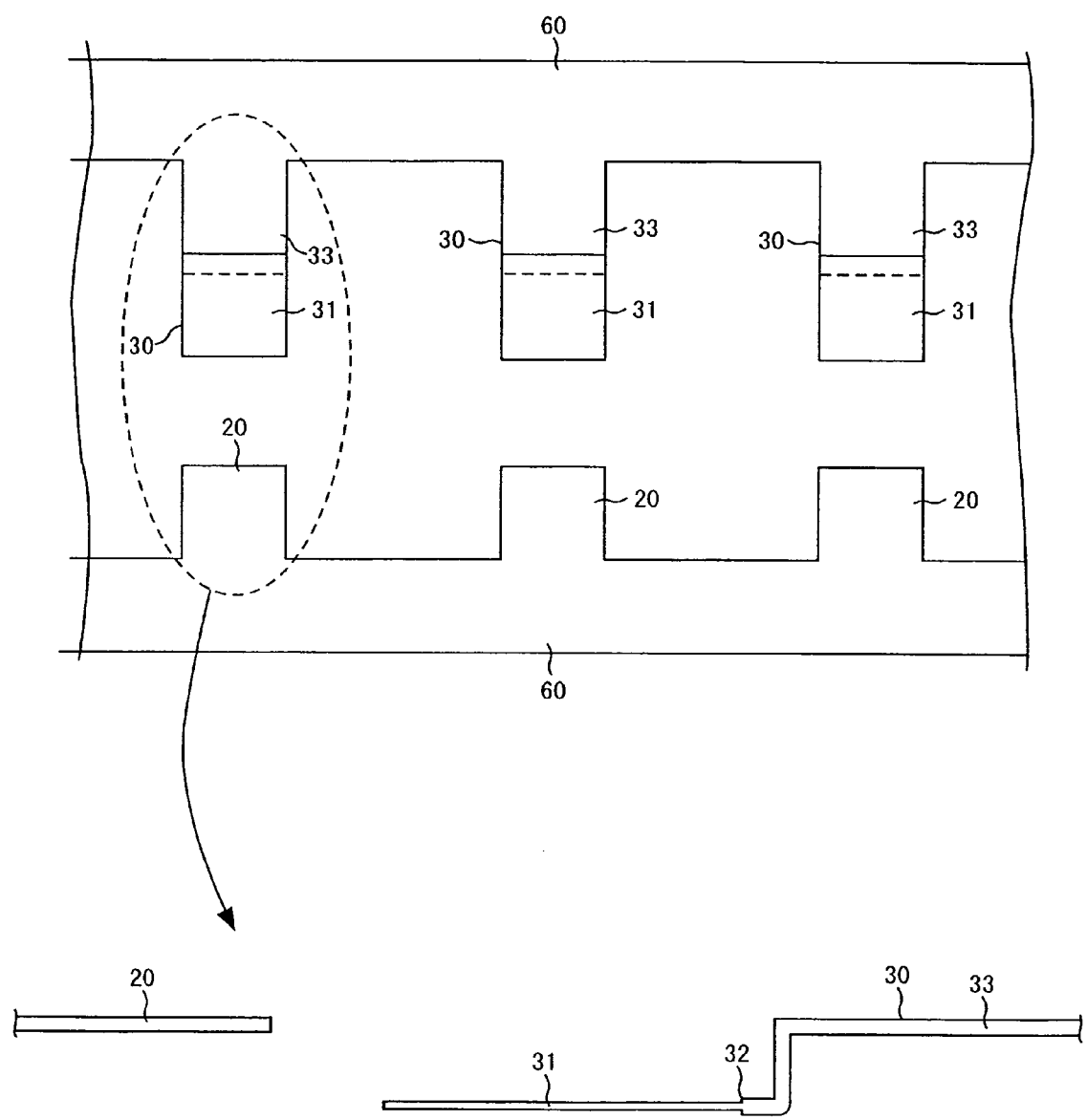
FIG. 6 is a third process drawing for explaining the manufacturing method of the solid electrolytic capacitor illustrated in FIG. 1.
Figure 7:
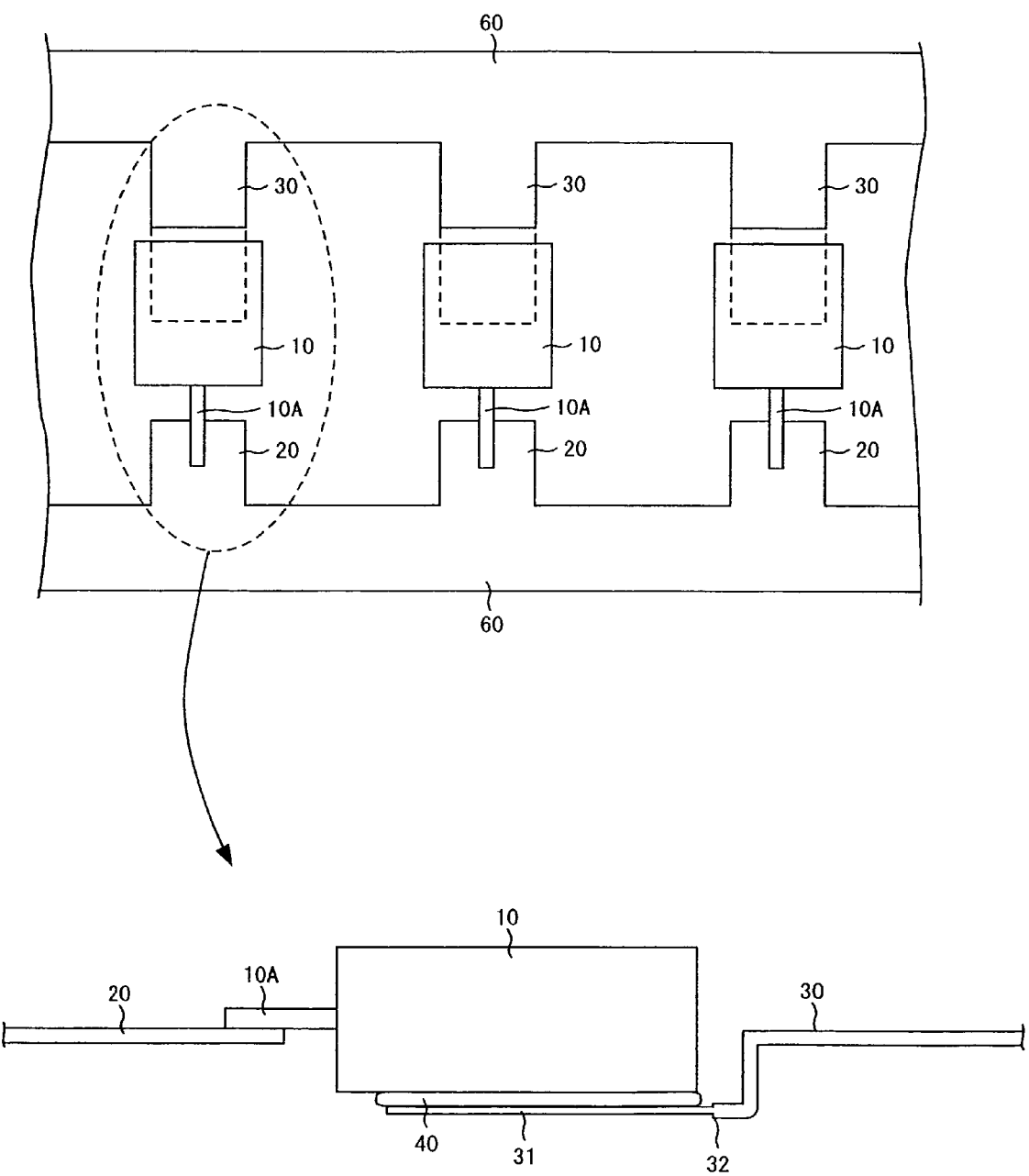
FIG. 7 is a fourth process drawing for explaining the manufacturing method of the solid electrolytic capacitor illustrated in FIG. 1.
Figure 8:
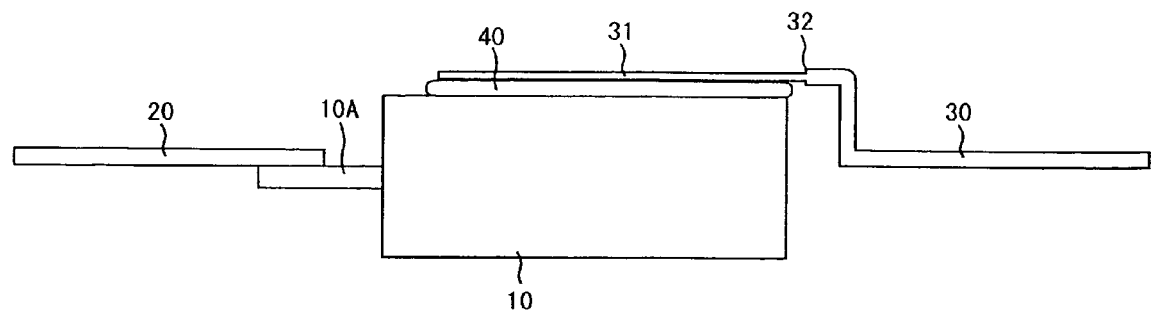
FIG. 8 is a fifth process drawing for explaining the manufacturing method of the solid electrolytic capacitor illustrated in FIG. 1.

Thereafter, a plurality of the cathode lead frames 30 are bent (see FIG. 6). In this case, in each of a plurality of the cathode lead frames 30, the cathode lead 33 is bent so that both the anode lead frame 20 and the cathode lead 33 of the cathode lead frame 30 are disposed approximately in a same plane as well as that the cathode lead 31 is disposed below the anode lead frame 20.

Then, a plurality of the capacitor elements 10 are manufactured to be disposed on a plurality of the anode lead frames 20 and on a plurality of the cathode lead frames 30, thereby manufacturing a plurality of sets wherein each set comprises the capacitor element 10, the anode lead frame 20 and the cathode lead frame 30. In each of a plurality of sets, the anode lead frame 20 is connected to the anode lead pin 10A, and the cathode lead frame 30 is connected to the cathode extraction layer 14 of the capacitor element 10 by the adhesive layer 40 (see FIG. 7).

Afterwards, a plurality of the anode lead frames 20 and a plurality of the cathode lead frames 30 are cut off from the lead frame 60, thereby manufacturing a plurality of the capacitor elements 10. In each of a plurality of the capacitor elements 10, the anode lead frame 20 and the cathode lead frame 30 are connected to the capacitor element 10 (see FIG. 8).

Figure 9:
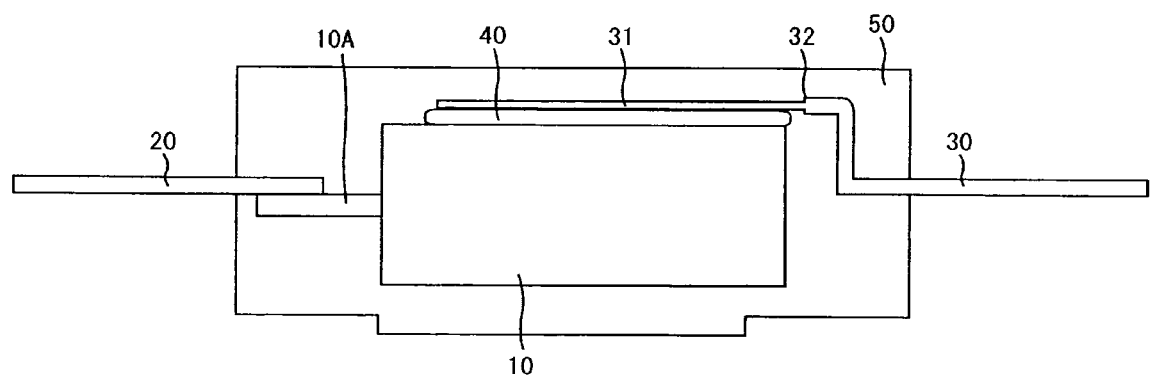
FIG. 9 is a sixth process drawing for explaining the manufacturing method of the solid electrolytic capacitor illustrated in FIG. 1.
Figure 10:
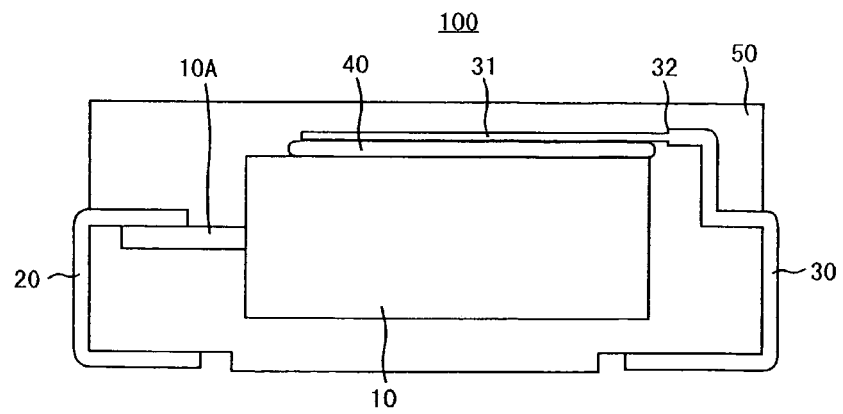
FIG. 10 is a seventh process drawing for explaining the manufacturing method of the solid electrolytic capacitor illustrated in FIG. 1.

Then, in each of a plurality of the capacitor elements 10, the capacitor element 10, a part of the anode lead frame 20, a part of the cathode lead frame 30 and the adhesive layer 40 are covered by the exterior resin 50 (see FIG. 9). Thereafter, the part of the anode lead frame 20 and the part of the cathode lead frame 30 protruding outside the exterior resin 50 are bent along the exterior resin 50 (see FIG. 10), thereby completing a plurality of the solid electrolytic capacitors 100.

As described above, in the manufacturing process of the solid electrolytic capacitor 100, only the corresponding part of the cathode lead 31 in the lead frame 60 is set to the thickness of 0.05 mm, whereas the other part is set to the thickness of 0.1 mm. Accordingly, the lead frame 60 is hard to be deformed, and there is no problem that the lead frame 60 having a plurality of capacitor elements 10 disposed thereupon cannot be stored in a magazine rack.

The Second Embodiment

Figure 11:
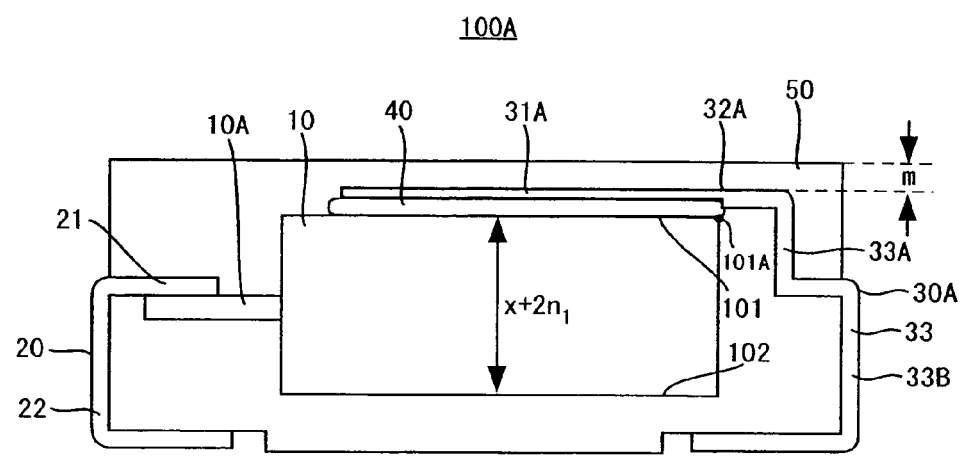
FIG. 11 is a schematic cross-sectional view illustrating a structure of a solid electrolytic capacitor according to the second embodiment of the present invention.

FIG. 11 is a schematic cross-sectional view illustrating a structure of a solid electrolytic capacitor according to the second embodiment of the present invention. Referring to FIG. 11, a solid electrolytic capacitor 100A according to the second embodiment is the same as the solid electrolytic capacitor 100 shown in FIG. 1 except for the cathode lead frame 30 of the solid electrolytic capacitor 100 replaced by a cathode lead frame 30A.

In the cathode lead frame 30A, the cathode lead 31 of the cathode lead frame 30 illustrated in FIG. 1 is replaced by a cathode lead 31A, and the boundary part 32 is replaced by a boundary part 32A. The cathode lead frame 30A is the same as the cathode lead frame 30 in other aspects.

The cathode lead 31A is disposed inside the exterior resin 50 to be connected to the cathode extraction layer 14 of the capacitor element 10 by the adhesive layer 40. The boundary part 32A is disposed between the cathode lead 31A and the cathode lead 33 so as to provide a level difference at the side of the capacitor element 10. Additionally, the boundary part 32A is disposed on an end 101A of a plane 101 out of two planes 101 and 102 disposed in the thickness direction of the capacitor element 10.

Figure 12:
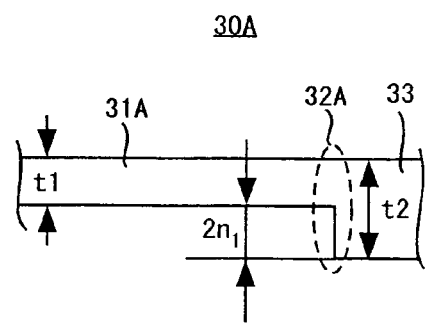
FIG. 12 is an enlarged view of around a boundary part of a cathode lead frame illustrated in FIG. 11.

FIG. 12 is an enlarged view of around the boundary part 32A of the cathode lead frame 30A shown in FIG. 11. Referring to FIG. 12, the cathode lead 31A has a thickness t1 of 0.05 mm.

The boundary part 32A has a rectangular cross-sectional shape, having a level difference $2 \times n_1$. The level difference $2 \times n_1$ is provided at the side of the capacitor element 10. The level difference $2 \times n_1$ equals to $2 \times 0.025$ mm, which is 0.05 mm. Accordingly, the boundary part 32A is disposed between the cathode lead 31A and the cathode lead 33 so as to provide the level difference $2 \times n_1$ only at the side of the capacitor element 10.

The cathode lead frame 30A has a structure that a part of a cathode lead frame having a thickness of 0.1 mm is reduced in thickness only from the side of the capacitor element 10. The cathode lead frame 30A is manufactured by pressing the corresponding part of the cathode lead 31A in the cathode lead frame having the thickness of 0.1 mm into the thickness of 0.05 mm.

Thus, according to the present invention, the cathode lead frame 30A has a structure that the connected part to the capacitor element 10 (the cathode lead 31A) is thinner than the other part (the cathode lead 33).

In addition, by using the cathode lead frame 30A having the level difference $2 \times n_1$ only at the side of the capacitor element 10, the thickness of the capacitor element 10 is set to $x+2n_1$ (see FIG. 11). Accordingly, by using the cathode lead frame 30A manufactured so as to provide the level difference $2 \times n_1$ only at the side of the capacitor element 10, the thickness of the capacitor element 10 can be made thicker just by $2 \times n_1$ than the thickness x of the capacitor element 210 used for the conventional solid electrolytic capacitor 200, while keeping the uniform thickness of the exterior resin 50. As a result, the capacitance of the capacitor element 10 can be substantially increased.

Table 1 shows the capacitances of the solid electrolytic capacitor 100 shown in FIG. 1 and the solid electrolytic capacitor 100A shown in FIG. 11, as compared with the capacitance of the conventional solid electrolytic capacitor 200.

TABLE 1

|  | Average capacitance (%) |
| --- | --- |
| Solid electrolytic capacitor 100 | 106 |
| Solid electrolytic capacitor 100A | 113 |
| Solid electrolytic capacitor 200 | 100 |

Table 1 shows average capacitances when manufacturing 5 sets of solid electrolytic capacitors 100, 100A and 200 respectively and measuring their capacitances.

In the case of using the cathode lead frame 30 provided with the level difference $n_1$ at the side of the capacitor element 10, the capacitance of the solid electrolytic capacitor 100 is increased by 6% compared with the capacitance of the conventional solid electrolytic capacitor 200. Also, in the case of using the cathode lead frame 30A provided with the level difference $2 \times n_1$ only at the side of the capacitor element 10, the capacitance of the solid electrolytic capacitor 100A is increased by 13% compared with the capacitance of the conventional solid electrolytic capacitor 200.

Thus, the capacitances of the solid electrolytic capacitors 100 and 100A are increased nearly in proportion to the increased thickness of the capacitor element 10. Consequently, the volumetric capacitance efficiencies of the solid electrolytic capacitors 100 and 100A can be made greater than the volumetric capacitance efficiency of the conventional solid electrolytic capacitor 200.

The solid electrolytic capacitor 100A is manufactured according to the above-described processes illustrated in FIG. 4 to FIG. 10. In the manufacturing process of the solid electrolytic capacitor 100A, when disposing the capacitor element 10 on the anode lead frame 20 and the cathode lead frame 30, positioning of the capacitor element 10 is facilitated, because the cathode lead frame 30A has the level difference $2 \times n_1$ as described above. That is, the capacitor element 10 is to be disposed on the anode lead frame 20 and the cathode lead frame 30 so as to make the end 101A of the capacitor element 10 correspond to the level difference of the cathode lead frame 30A. Consequently, variations of contact resistance can be reduced in the boundary part between the capacitor element 10 and the cathode lead frame 30A.

All the others are the same as the first embodiment.

The Third Embodiment

Figure 13:
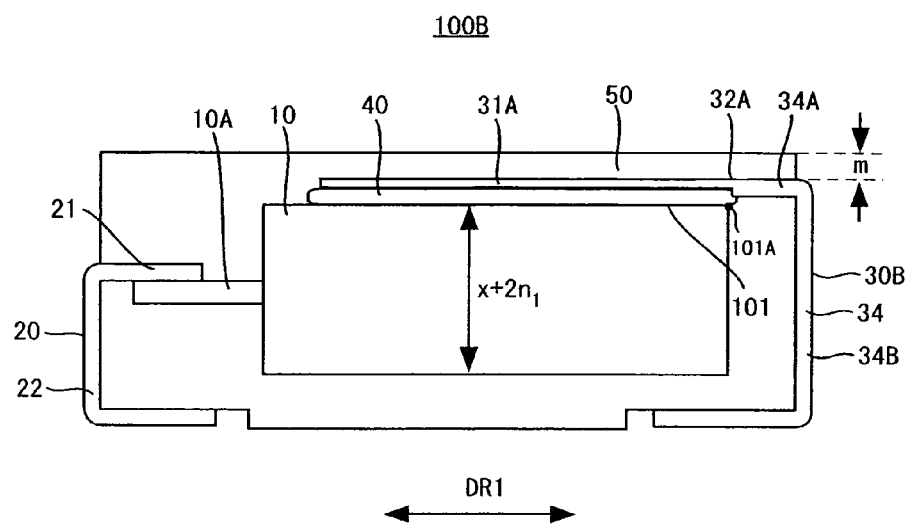
FIG. 13 is a schematic cross-sectional view illustrating a structure of a solid electrolytic capacitor according to the third embodiment of the present invention.

FIG. 13 is a schematic cross-sectional view illustrating a structure of a solid electrolytic capacitor according to the third embodiment of the present invention. Referring to FIG. 13, a solid electrolytic capacitor 100B according to the third embodiment is the same as the solid electrolytic capacitor 100A shown in FIG. 11 except for the cathode lead frame 30A of the solid electrolytic capacitor 100A replaced by a cathode lead frame 30B.

The cathode lead frame 30B is the same as the cathode lead frame 30A shown in FIG. 11 except for the cathode lead 33 of the cathode lead frame 30A replaced by a cathode lead 34.

The cathode lead 34 comprises a first part 34A and a second part 34B, having a thickness t2 of 0.1 mm. The first part 34A is linearly connected to the cathode lead 31A by the boundary part 32A. Consequently, the linearly arranged first part 34A of the cathode lead 34, the boundary part 32A and the cathode lead 31A are disposed inside the exterior resin 50 and parallel to the capacitor element 10. The second part 34B of the cathode lead 34 is disposed along the exterior resin 50 at the outside of the exterior resin 50.

In the cathode lead frame 30B of the solid electrolytic capacitor 100B, the linearly arranged first part 34A of the cathode lead 34, the boundary part 32A and the cathode lead 31A are disposed inside the exterior resin 50 and in parallel with the capacitor element 10. Therefore, the dimensions of the capacitor element 10 can be increased in the direction DR1 parallel to the plane 101. Consequently, the volume of the capacitor element 10 is increased, thereby increasing the volumetric capacitance efficiency of the solid electrolytic capacitor 100B.

The solid electrolytic capacitor 100B is manufactured in accordance with the processes illustrated in FIG. 4 to FIG. 10.

All the others are the same as the first and the second embodiments.

The Fourth Embodiment

Figure 14:
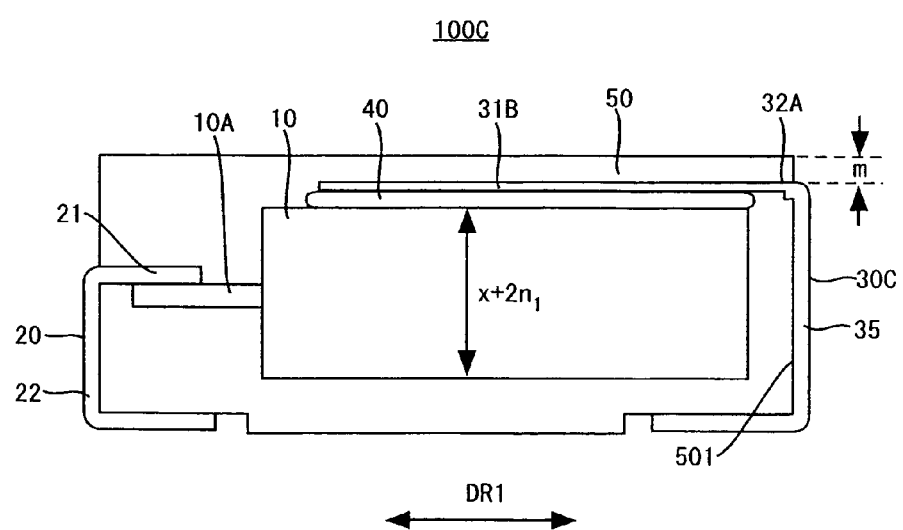
FIG. 14 is a schematic cross-sectional view illustrating a structure of a solid electrolytic capacitor according to the fourth embodiment of the present invention.

FIG. 14 is a schematic cross-sectional view illustrating a structure of a solid electrolytic capacitor according to the fourth embodiment of the present invention. With reference to FIG. 14, a solid electrolytic capacitor 100C according to the fourth embodiment is the same as the solid electrolytic capacitor 100B illustrated in FIG. 13 except for the cathode lead frame 30B of the solid electrolytic capacitor 100B replaced by a cathode lead frame 30C.

The cathode lead frame 30C is the same as the cathode lead frame 30B except that the cathode leads 31A and 34 of the cathode lead frame 30B are respectively replaced by cathode leads 31B and 35.

The cathode lead 31B has the thickness t1 of 0.05 mm, having a length longer than the cathode lead 31A in the direction DR1. And the cathode lead 31B is connected to the cathode extraction layer 14 of the capacitor element 10 by the adhesive layer 40 as well as connected to the cathode lead 35 by the boundary part 32A.

The cathode lead 31B and the boundary part 32A are disposed inside the exterior resin 50 and in parallel with the capacitor element 10. In the solid electrolytic capacitor 100C, the boundary part 32A is disposed close to a plane 501 of the first and the second planes 501 and 502 disposed generally perpendicular to two planes disposed in the thickness direction of the exterior resin 50. The cathode lead 35 has a thickness t2 of 0.1 mm, and is disposed along the exterior resin 50 at the outside of the exterior resin 50.

Thus, in the solid electrolytic capacitor 100C, the cathode lead 31B of the cathode lead frame 30C has the thickness t1 of 0.05 mm, and is disposed inside the exterior resin 50 and in parallel with the capacitor element 10. Accordingly, the dimensions of the capacitor element 10 can be increased in the direction DR1. As a result, the volume of the capacitor element 10 is increased, thereby increasing the volumetric capacitance efficiency of the solid electrolytic capacitor 100C.

The solid electrolytic capacitor 100C is manufactured in accordance with the processes illustrated in FIG. 4 to FIG. 10.

All the others are the same as the first, the second and the third embodiments.

The Fifth Embodiment

Figure 15:
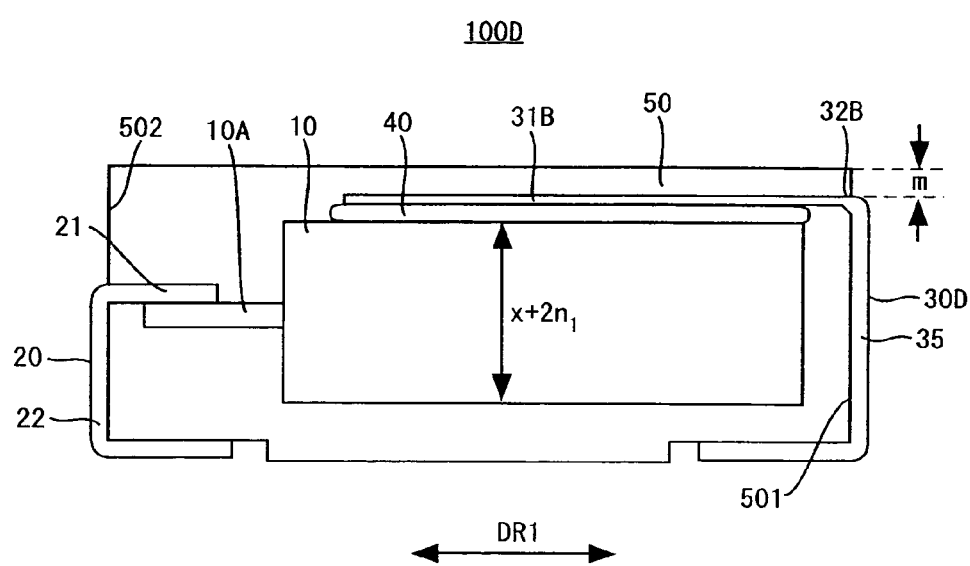
FIG. 15 is a schematic cross-sectional view illustrating a structure of a solid electrolytic capacitor according to the fifth embodiment of the present invention.

FIG. 15 is a schematic cross-sectional view illustrating a structure of a solid electrolytic capacitor according to the fifth embodiment of the present invention. With reference to FIG. 15, a solid electrolytic capacitor 100D according to the fifth embodiment is the same as the solid electrolytic capacitor 100C illustrated in FIG. 14 except for the cathode lead frame 30C of the solid electrolytic capacitor 100C replaced by a cathode lead frame 30D.

The cathode lead frame 30D is the same as the cathode lead frame 30C illustrated in FIG. 14 except for the boundary part 32A of the cathode lead frame 30C replaced by a boundary part 32B.

The boundary part 32B is disposed close to the plane 501 in the same way as the boundary part 32A of the solid electrolytic capacitor 100C, connecting the cathode lead 31B to the cathode lead 35.

Figure 16:
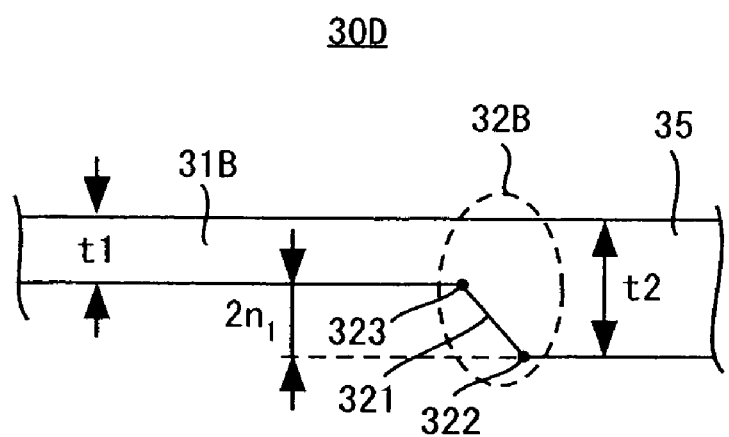
FIG. 16 is an enlarged view of around a boundary part of a cathode lead frame illustrated in FIG. 15.

FIG. 16 is an enlarged view of around the boundary part 32B of the cathode lead frame 30D illustrated in FIG. 15. Referring to FIG. 16, the boundary part 32B has a level difference composed of a slope 321 formed in the direction from the cathode lead 35 toward the cathode lead 31B. And the level difference composed of the slope 321 is formed at the side of the capacitor element 10.

Figure 17:
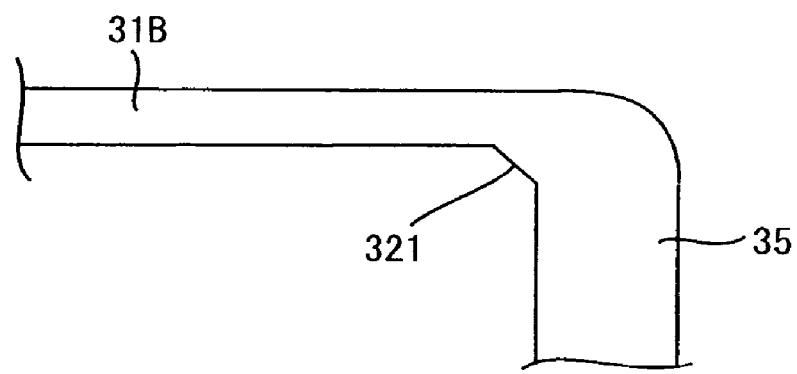
FIG. 17 is a cross-sectional view showing a bent state of the cathode lead frame illustrated in FIG. 16.

FIG. 17 is a cross-sectional view illustrating a bent state of the cathode lead frame 30D shown in FIG. 16. When bending the cathode lead frame 30D at a supporting point 322, a root part 323 of the level difference is not stretched, thereby not generating a crack (see FIG. 17), because the boundary part 32B has the slope 321. As a result, even when bending the cathode lead frame 30D, an electrical resistance does not change as well as that an equivalent series resistance (ESR) of the solid electrolytic capacitor 100D does not increase.

In the solid electrolytic capacitor 100D, the linearly connected cathode lead 31B and the boundary part 32B are disposed inside the exterior resin 50 and in parallel with the capacitor element 10. Accordingly, the dimensions of the capacitor element 10 can be increased in the direction DR1. Consequently, the volumetric capacitance efficiency of the solid electrolytic capacitor 100D is enhanced by the increased volume of the capacitor element 10.

Moreover, the boundary part 32B of the cathode lead frame 30D has the level difference composed of the slope 321. Therefore, even when bending the cathode lead frame 30D, a crack is not generated in the cathode lead frame 30D, thereby preventing the equivalent series resistance (ESR) of the solid electrolytic capacitor 100D from increasing.

The solid electrolytic capacitor 100D is manufactured in accordance with the processes illustrated in FIG. 4 to FIG. 10.

All the others are the same as the first to the fourth embodiments.

The Sixth Embodiment

Figure 18:
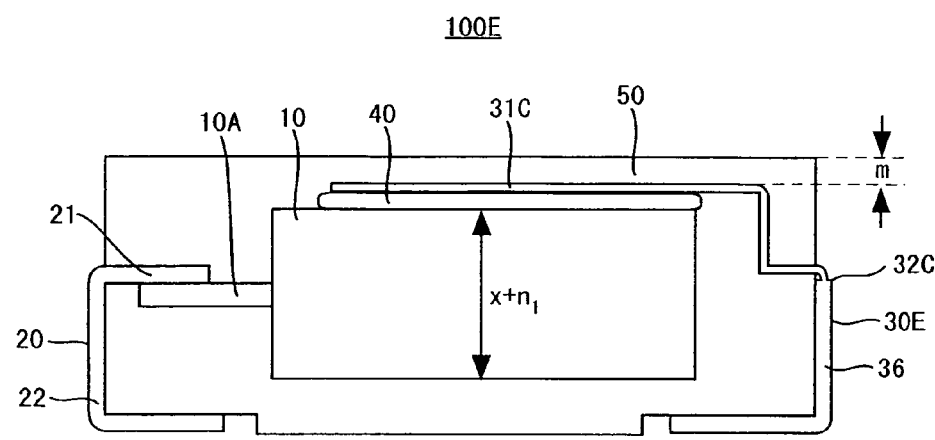
FIG. 18 is a schematic cross-sectional view illustrating a structure of a solid electrolytic capacitor according to the sixth embodiment of the present invention.

FIG. 18 is a schematic cross-sectional view illustrating a structure of a solid electrolytic capacitor according to the sixth embodiment of the present invention. With reference to FIG. 18, a solid electrolytic capacitor 100E according to the sixth embodiment is the same as the solid electrolytic capacitor 100 illustrated in FIG. 1 except for the cathode lead frame 30 of the solid electrolytic capacitor 100 replaced by a cathode lead frame 30E.

The cathode lead frame 30E includes a cathode lead 31C, a cathode lead 36 and a boundary part 32C. The cathode lead 31C has the thickness t1 of 0.05 mm, whereas the cathode lead 36 has the thickness t2 of 0.1 mm. The boundary part 32C has the same structure as the boundary part 32 (see FIG. 1 and FIG. 3), connecting the cathode lead 31C to the cathode lead 36 so as to provide the level differences $n_1$ and $n_2$ at the side of the capacitor element 10 and at the opposite side of the capacitor element 10 respectively.

The cathode lead 31C is disposed inside the exterior resin 50, and the boundary part 32C is disposed in contact with the exterior resin 50 at the outside of the exterior resin 50. And the cathode lead 36 is disposed along the exterior resin 50 at the outside of the exterior resin 50. Consequently, in the solid electrolytic capacitor 100E, the capacitor element 10 has the thickness $x+n_1$.

In the solid electrolytic capacitor 100E, the thickness of the capacitor element 10 is set to the thickness $x+n_1$, which is thicker than the capacitor element 210 of the conventional solid electrolytic capacitor 200, and therefore the volumetric capacitance efficiency can be increased by the increased volume of the capacitor element 10.

Additionally, the boundary part 32C is formed in contact with the exterior resin 50. Therefore, the boundary part 32C can be used as a basis for positioning when the capacitor element 10, the first part 21 of the anode lead frame 20, the cathode lead 31C and the adhesive layer 40 are covered by the exterior resin 50. Consequently, variations in covering by the exterior resin 50 are eliminated, and variations in size of the solid electrolytic capacitor 100E are also eliminated.

The solid electrolytic capacitor 100E is manufactured in accordance with the processes illustrated in FIG. 4 to FIG. 10.

In addition, according to the sixth embodiment, the boundary part 32C may be replaced by the boundary part 32B (see FIG. 15).

All the others are the same as the first embodiment.

The Seventh Embodiment

Figure 19:
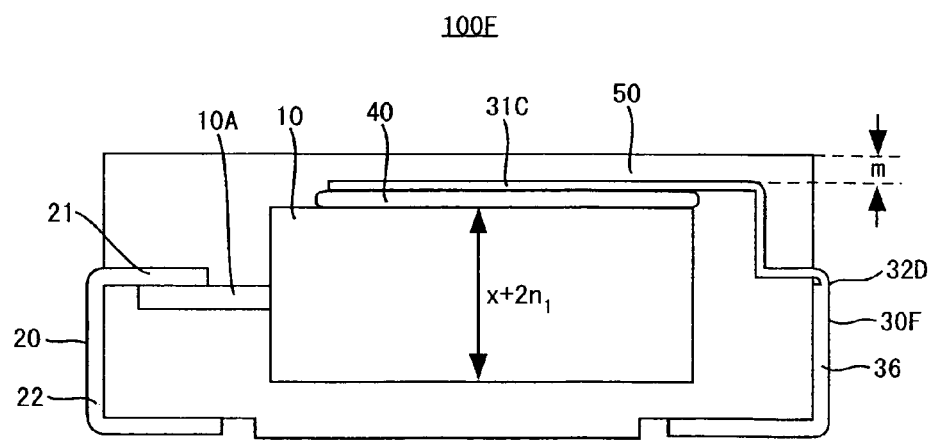
FIG. 19 is a schematic cross-sectional view illustrating a structure of a solid electrolytic capacitor according to the seventh embodiment of the present invention.

FIG. 19 is a schematic cross-sectional view illustrating a structure of a solid electrolytic capacitor according to the seventh embodiment of the present invention. With reference to FIG. 19, a solid electrolytic capacitor 100F is the same as the solid electrolytic capacitor 100E illustrated in FIG. 18 except for the cathode lead frame 30E of the solid electrolytic capacitor 100E replaced by a cathode lead frame 30F.

The cathode lead frame 30F is the same as the cathode lead frame 30E illustrated in FIG. 18 except for the boundary part 32C of the cathode lead frame 30E replaced by a boundary part 32D. The boundary part 32D has the same structure as the boundary part 32A shown in FIG. 11 and FIG. 12, connecting the cathode lead 31C to the cathode lead 36 so as to provide the level difference $2 \times n_1$ only at the side of the capacitor element 10. The boundary part 32D is disposed in contact with the exterior resin 50.

Consequently, in the solid electrolytic capacitor 100F, the capacitor element 10 has a thickness of $x+2n_1$.

In the solid electrolytic capacitor 100F, the thickness of the capacitor element 10 is set to the thickness $x+2n_1$, which is thicker than the capacitor element 210 of the conventional solid electrolytic capacitor 200, and therefore the volumetric capacitance efficiency can be increased by the increased volume of the capacitor element 10.

Additionally, the boundary part 32D is formed in contact with the exterior resin 50. Therefore, the boundary part 32D can be used as a basis for positioning when the capacitor element 10, the first part 21 of the anode lead frame 20, the cathode lead 31C and the adhesive layer 40 are covered by the exterior resin 50. Consequently, variations in covering by the exterior resin 50 as well as variations in size of the solid electrolytic capacitor 100F are eliminated.

The solid electrolytic capacitor 100F is manufactured in accordance with the processes illustrated in FIG. 4 to FIG. 10.

In addition, the boundary part 32D may be replaced by the boundary part 32B (see FIG. 15) according to the seventh embodiment.

All the others are the same as the first and the sixth embodiments.

The Eighth Embodiment

Figure 20:
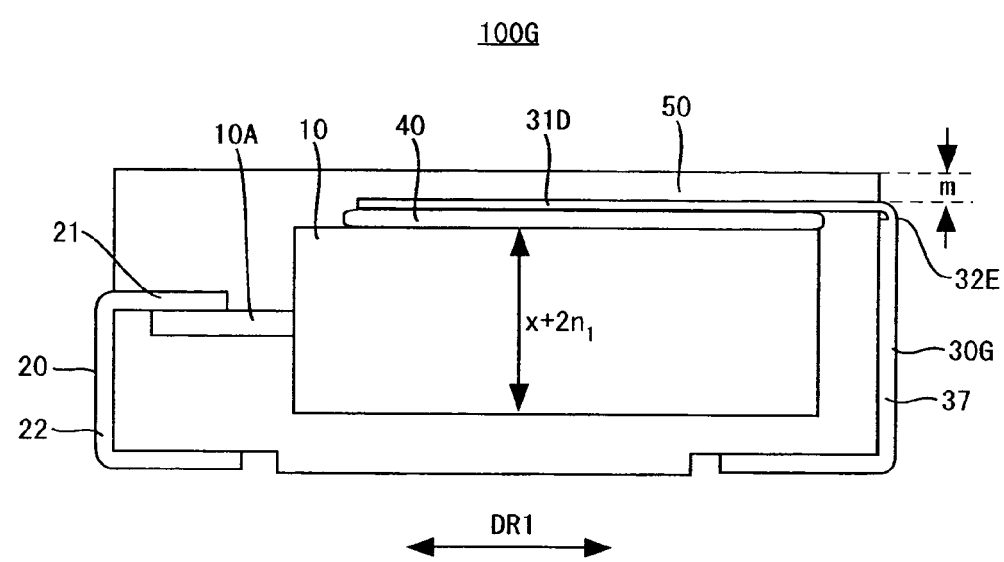
FIG. 20 is a schematic cross-sectional view illustrating a structure of a solid electrolytic capacitor according to the eighth embodiment of the present invention.

FIG. 20 is a schematic cross-sectional view illustrating a structure of a solid electrolytic capacitor according to the eighth embodiment of the present invention. With reference to FIG. 20, a solid electrolytic capacitor 100G according to the eighth embodiment is the same as the solid electrolytic capacitor 100A illustrated in FIG. 11 except for the cathode lead frame 30A of the solid electrolytic capacitor 100A replaced by a cathode lead frame 30G.

The cathode lead frame 30G includes a cathode lead 31D, a cathode lead 37 and a boundary part 32E. The cathode lead 31D has the thickness t1 of 0.05 mm, whereas the cathode lead 37 has the thickness t2 of 0.1 mm. The boundary part 32E has the same structure as the boundary part 32A (see FIG. 11 and FIG. 12), and the boundary part 32E is disposed between the cathode lead 31D and the cathode lead 37 so as to provide the level difference $2 \times n_1$ only at the side of the capacitor element 10.

The cathode lead 31D is disposed inside the exterior resin 50 and in parallel with the capacitor element 10, and boundary part 32E is disposed in contact with the exterior resin 50 at the outside of the exterior resin 50. And the cathode lead 37 is disposed along the exterior resin 50 at the outside of the exterior resin 50. Consequently, in the solid electrolytic capacitor 10G, the capacitor element 10 has the thickness $x+2n_1$.

In the solid electrolytic capacitor 10G, the thickness of the capacitor element 10 is set to the thickness $x+2n_1$, which is thicker than the capacitor element 210 of the conventional solid electrolytic capacitor 200, and therefore the volumetric capacitance efficiency can be increased by the increased volume of the capacitor element 10.

Furthermore, in the solid electrolytic capacitor 10G, the cathode lead 31D is disposed parallel to the capacitor element 10, and accordingly the dimensions of the capacitor element 10 can be increased in the direction DR1. Consequently, the volumetric capacitance efficiency can be increased by the increased volume of the capacitor element 10.

The solid electrolytic capacitor 100G is manufactured in accordance with the processes illustrated in FIG. 4 to FIG. 10.

Additionally, according to the eighth embodiment, the boundary part 32C may be replaced either by the boundary part 32 (see FIG. 1 and FIG. 3) or by the boundary part 32B (see FIG. 15).

All the others are the same as the first and the second embodiments.

The Ninth Embodiment

Figure 21:
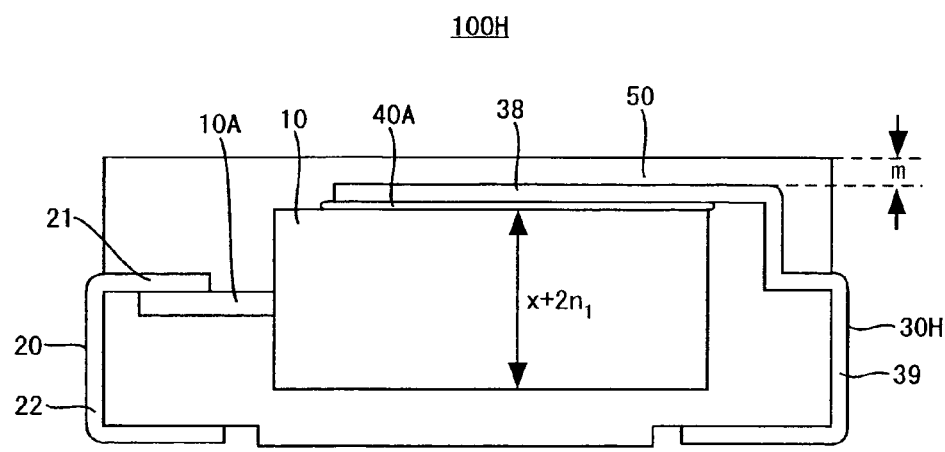
FIG. 21 is a schematic cross-sectional view illustrating a structure of a solid electrolytic capacitor according to the ninth embodiment of the present invention.

FIG. 21 is a schematic cross-sectional view illustrating a structure of a solid electrolytic capacitor according to the ninth embodiment of the present invention. Referring to FIG. 21, a solid electrolytic capacitor 100H according to the ninth embodiment is the same as the solid electrolytic capacitor 100 illustrated in FIG. 1 except that the cathode lead frame 30 and the adhesive layer 40 of the solid electrolytic capacitor 100 are respectively replaced by a cathode lead frame 30H and an adhesive layer 40A.

The cathode lead frame 30H is formed by thickening the cathode lead 31 shown in FIG. 1, entirely having the thickness t2 of 0.1 mm. And the cathode lead frame 30H comprises a cathode leads 38 and 39. The cathode lead 38 is disposed inside the exterior resin 50 to be connected to the cathode extraction layer 14 of the capacitor element 10 by the adhesive layer 40A. The cathode lead 39 is disposed along the exterior resin 50 at the outside of the exterior resin 50.

The adhesive layer 40A is made of a conductive adhesive, having a thickness of 0.05 mm. That is, the adhesive layer 40A has a thickness of $t2-2\times n_1$. The adhesive layer 40A is disposed between the capacitor element 10 and the cathode lead 38. The thickness of the adhesive layer 40A is set to 0.05 mm, which is thinner than 0.1 mm of the thickness of the adhesive layer 40. As the thickness of 0.05 mm corresponds to $2\times n_1$, the thickness of the capacitor element 10 is set to $x+2n_1$ in the solid electrolytic capacitor 100H.

Thus, in the solid electrolytic capacitor 100H, the volume of the capacitor element 10 can be made larger than the capacitor element 210 of the conventional solid electrolytic capacitor 200 by reducing the thickness of the adhesive layer 40A, thereby increasing the volumetric capacitance efficiency of the solid electrolytic capacitor 100H.

The solid electrolytic capacitor 100H is manufactured in accordance with the processes illustrated in FIG. 4 to FIG. 10.

All the others are the same as the first embodiment.

The Tenth Embodiment

Figure 22:
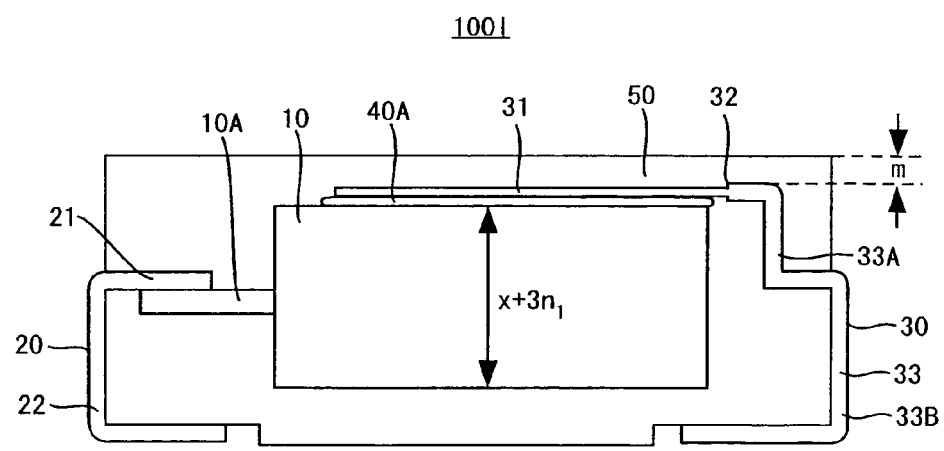
FIG. 22 is a schematic cross-sectional view illustrating a structure of a solid electrolytic capacitor according to the tenth embodiment of the present invention.

FIG. 22 is a schematic cross-sectional view illustrating a structure of a solid electrolytic capacitor according to the tenth embodiment of the present invention. With reference to FIG. 22, a solid electrolytic capacitor 100I according to the tenth embodiment is the same as the solid electrolytic capacitor 100H illustrated in FIG. 21 except for the cathode lead frame 30H of the solid electrolytic capacitor 100H replaced by the cathode lead frame 30 (see FIG. 1).

In the solid electrolytic capacitor 100I, the cathode lead 31 is connected to the cathode extraction layer 14 of the capacitor element 10 by the adhesive layer 40A. Additionally, in the solid electrolytic capacitor 100I, a thickness of the adhesive layer 40A is set to be thinner in thickness than the second part 33B of the cathode lead 33.

As described above, the cathode lead frame 30 is disposed so that the level differences $n_1$ and $n_2$ are respectively provided at the side of the capacitor element 10 and at the opposite side of the capacitor element 10, and the adhesive layer 40A has the thickness $t2-2\times n_1$. Accordingly, in the solid electrolytic capacitor 100I, the thickness of the capacitor element 10 is set to $x+3n_1$.

As a result, the volume of the capacitor element 10 can be made larger than the capacitor element 210 of the conventional solid electrolytic capacitor 200, thereby increasing the volumetric capacitance efficiency of the solid electrolytic capacitor 100I.

The solid electrolytic capacitor 100I is manufactured in accordance with the processes illustrated in FIG. 4 to FIG. 10.

Moreover, according to the tenth embodiment, the cathode lead frame 30 may be replaced by any one of the cathode lead frames 30A, 30B, 30C, 30D, 30E, 30F and 30G.

All the others are the same as the first to the eighth embodiments.

The Eleventh Embodiment

Figure 23:
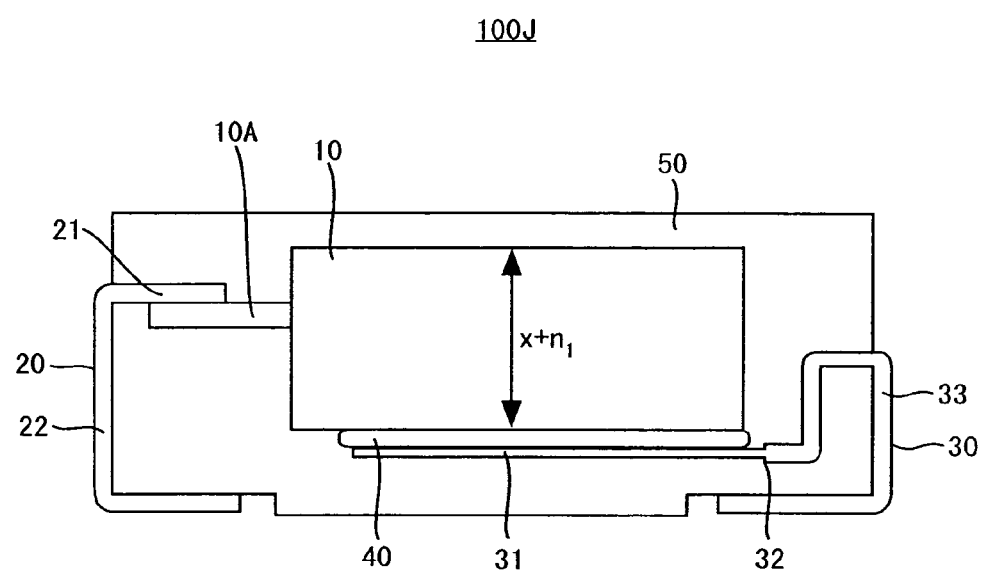
FIG. 23 is a schematic cross-sectional view illustrating a structure of a solid electrolytic capacitor according to the eleventh embodiment of the present invention.

FIG. 23 is a schematic cross-sectional view illustrating a solid electrolytic capacitor according to the eleventh embodiment of the present invention. With reference to FIG. 23, a solid electrolytic capacitor 100J according to the eleventh embodiment is the same as the solid electrolytic capacitor 100 except that the boundary part between the capacitor element 10 of the solid electrolytic capacitor 100 and the cathode lead frame 30 is disposed below the capacitor element 10.

Thus, also in the solid electrolytic capacitor 100J, the volumetric capacitance efficiency can be enhanced, the moisture resistance can be improved and the strength of the lead frame can be ensured.

The solid electrolytic capacitor 100J is manufactured in accordance with the processes illustrated in FIG. 4 to FIG. 10.

Also, according to the eleventh embodiment, in the solid electrolytic capacitors 100A, 100B, 100C, 100D, 100E, 100F, 100G, 100H and 100I, boundary parts between the capacitor element 10 and the cathode lead frames 30A, 30B, 30C, 30D, 30E, 30F, 30G and 30H may be disposed below the capacitor element 10.

All the others are the same as the first to the tenth embodiments.

According to the present invention, in the each of the cathode lead frames 30, 30A, 30B, 30C, 30D, 30E, 30F, 30G and 30H, a connected part to the capacitor element 10 may have a thickness other than 0.05 mm, and in general, a connected part to the capacitor element 10 only needs to have a thickness thinner than the part disposed outside of the exterior resin 50.

It should be understood that the embodiments disclosed herein are to be taken as examples and not limited in any points. The scope of the present invention is defined not by the above described embodiments but by the following claims. All changes that fall within means and bounds of the claims, or equivalence of such means and bounds are intended to embraced by the claims.

I claim:

1. A solid electrolytic capacitor comprising:
a capacitor element;
an anode lead frame connected to an anode of the capacitor element;
a cathode lead frame connected to a cathode of the capacitor element; and
an exterior resin covering the capacitor element, a part of the anode lead frame and a part of the cathode lead frame, wherein
the cathode lead frame includes:
a first cathode lead frame connected to the cathode;
a second cathode lead frame; and
a boundary part disposed between the first cathode lead frame and the second cathode lead frame so as to provide a level difference at the capacitor element side, wherein
in the first cathode lead frame, the connected part to the cathode is disposed inside the exterior resin, and
the first cathode lead frame is thinner in thickness than the second cathode lead frame.

2. The solid electrolytic capacitor according to claim 1, further comprising:
an adhesive layer bonding the first cathode lead frame to the cathode, wherein the adhesive layer is thinner in thickness than the second cathode lead frame.

3. A solid electrolytic capacitor comprising:
a capacitor element;
an anode lead frame connected to an anode of the capacitor element;
a cathode lead frame connected to a cathode of the capacitor element;
an adhesive layer bonding the cathode lead frame to the cathode; and
an exterior resin covering the capacitor element, a part of the anode lead frame, a part of the cathode lead frame and the adhesive layer, wherein
the adhesive layer is thinner in thickness than the cathode lead frame.

4. The solid electrolytic capacitor according to claim 3, wherein
the cathode lead frame includes:
a first cathode lead frame connected to the cathode;
a second cathode lead frame; and
a boundary part disposed between the first cathode lead frame and the second cathode lead frame so as to provide a level difference at the capacitor element side, wherein the first cathode lead frame is thinner in thickness than the second cathode lead frame.

5. The solid electrolytic capacitor according to any one of claims 1, 2, and 4, wherein the first cathode lead frame is disposed inside the exterior resin, and at least a part of the second cathode lead frame is disposed along the exterior resin.

6. The solid electrolytic capacitor according to claim 5, wherein
a boundary part between the first cathode lead frame and the second cathode lead frame is disposed inside the exterior resin.

7. The solid electrolytic capacitor according to claim 6, wherein
the capacitor element comprises a cube or a rectangular parallelepiped whose cross-sectional shape is quadrangular, and
the boundary part is disposed on either an end of a first plane or an end of a second plane disposed in a thickness direction of the capacitor element.

8. The solid electrolytic capacitor according to claim 6, wherein
the exterior resin comprises a cube or a rectangular parallelepiped whose cross-sectional shape is quadrangular, and
the boundary part is disposed close to either a first plane or a second plane disposed generally perpendicular to two planes disposed in a thickness direction of the exterior resin.

9. The solid electrolytic capacitor according to claim 8, wherein
the capacitor element comprises a cube or a rectangular parallelepiped whose cross-sectional shape is quadrangular, and
the first cathode lead frame is disposed inside the exterior resin and generally parallel to the capacitor element.

10. The solid electrolytic capacitor according to claim 6, wherein
the boundary part has a rectangular cross-sectional shape.

11. The solid electrolytic capacitor according to claim 6, wherein
the boundary part has a level difference composed of a slope formed in a direction from the second cathode lead frame toward the first cathode lead frame.

12. The solid electrolytic capacitor according to claim 5, wherein
a boundary part between the first cathode lead frame and the second cathode lead frame is disposed outside of the exterior resin.

13. The solid electrolytic capacitor according to claim 12, wherein
the capacitor element comprises a cube or a rectangular parallelepiped whose cross-sectional shape is quadrangular, and
the first cathode lead frame is disposed inside the exterior resin and generally parallel to the capacitor element.

* * * * *